Sept. 10, 1963 G. SEROTTA 3,103,557

INTERCOMMUNICATION SYSTEMS

Filed Oct. 19, 1960 2 Sheets-Sheet 1

INVENTOR
GEORGE SEROTTA

William G. Miller Jr.
AGENT

Sept. 10, 1963 G. SEROTTA 3,103,557

INTERCOMMUNICATION SYSTEMS

Filed Oct. 19, 1960 2 Sheets-Sheet 2

INVENTOR
GEORGE SEROTTA

William G. Miller Jr.
AGENT

United States Patent Office 3,103,557

Patented Sept. 10, 1963

3,103,557

INTERCOMMUNICATION SYSTEMS

George Serotta, Philadelphia, Pa.
(1155 Easton Road, Roslyn, Pa.)

Filed Oct. 19, 1960, Ser. No. 63,584
6 Claims. (Cl. 179—37)

This invention relates to intercommunication systems and more particularly to those of the type utilizing a single amplifier for a plurality of interconnected stations each capable of selectively communicating with any other station.

It is an object of this invention to provide an improved intercommunication system of the type described above.

It is another object of this invention to provide an intercommunication system which requires only a minimum number of components such as relays and power sources.

It is a further object of this invention to provide an intercommunication system with reduced susceptibility to feedback between the talking circuit and the listening circuit without uneconomical separation of these circuits.

A still further object of this invention is the provision of an intercommunication system capable of selecting any number of other stations and selectively disconnecting any of those selected without interruption of the connections to those which remain selected.

It is a further object of this invention to provide an intercommunication system wherein the individual stations may be connected by short leads to bus wires which pass serially to all of the station locations.

A further object of this invention is the provision of a circuit for selecting stations by direct connection and without the use of relays.

For carrying out these objects there is provided a transducer for both transmission and reception at each of a plurality of stations. A cable having a calling station bus wire, a selected station bus wire and a common selected station bus wire is passed serially to each station, and an amplifier is connected by first and second amplifier leads to the calling station bus wire and the selected station bus wire, respectively. A relay is provided for connecting the first and second amplifier leads to the amplifier output and input, respectively, when the relay is in its normal state and for reversing those connections when it is in its other state. Each station is provided with a first switch for connecting the transducer to the selected station bus wire in one position and for connecting it to the calling station bus wire in the other position, a second switch for making a selective connection between the selected station bus wire of the station being selected and the common selected station bus, and a third switch for operating the relay when the calling station desires to talk.

These and further objects, advantages, and novel features, as well as the invention itself, may be best understood from the following description when read in conjunction with the drawing in which.

Figure 1:
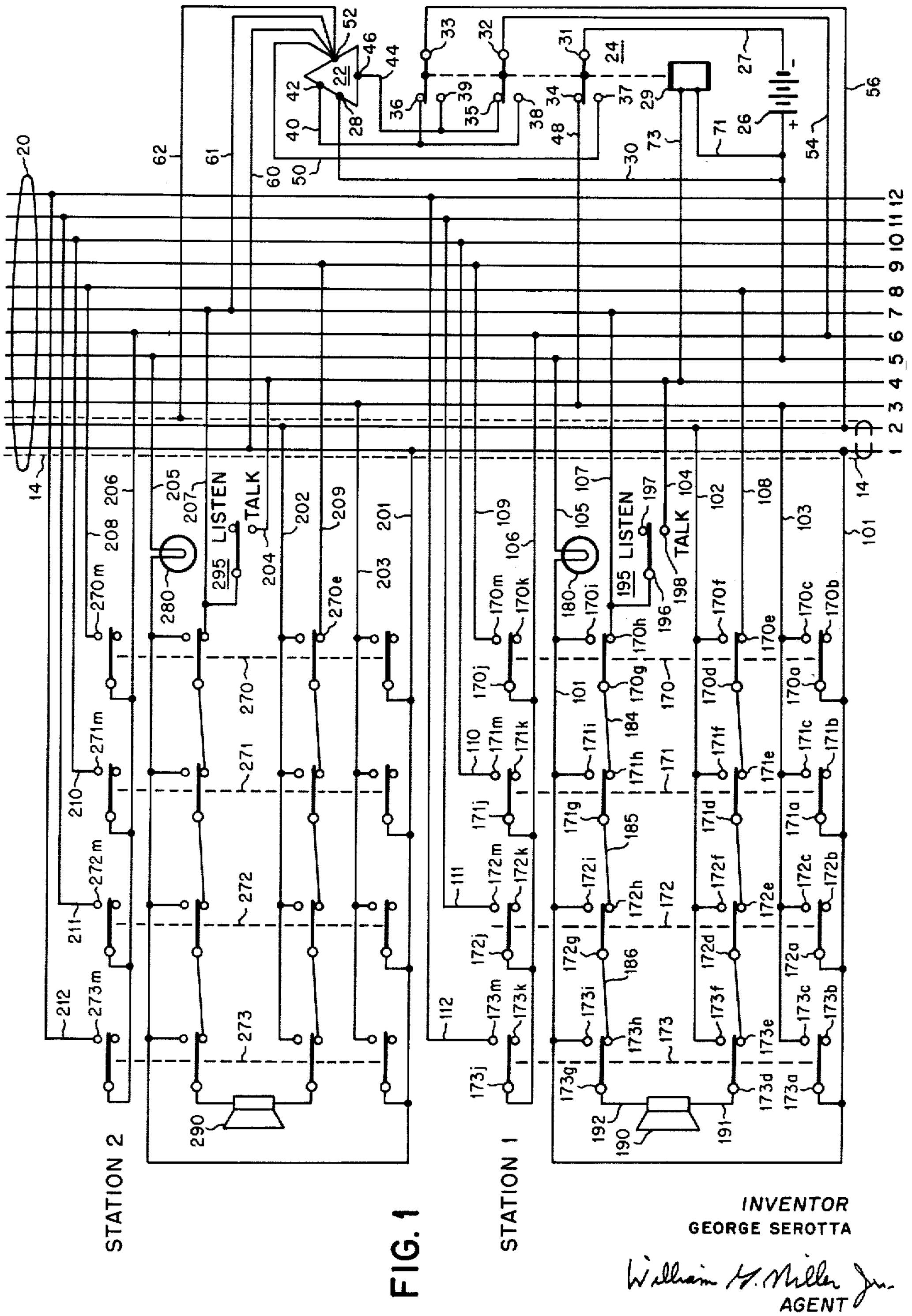
FIG. 1 is a circuit diagram of a part of the system.
Figure 3:
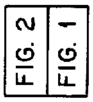
FIG. 3 shows how FIG. 1 and FIG. 2 can be combined to provide a circuit diagram of the entire system.
Figure 2:
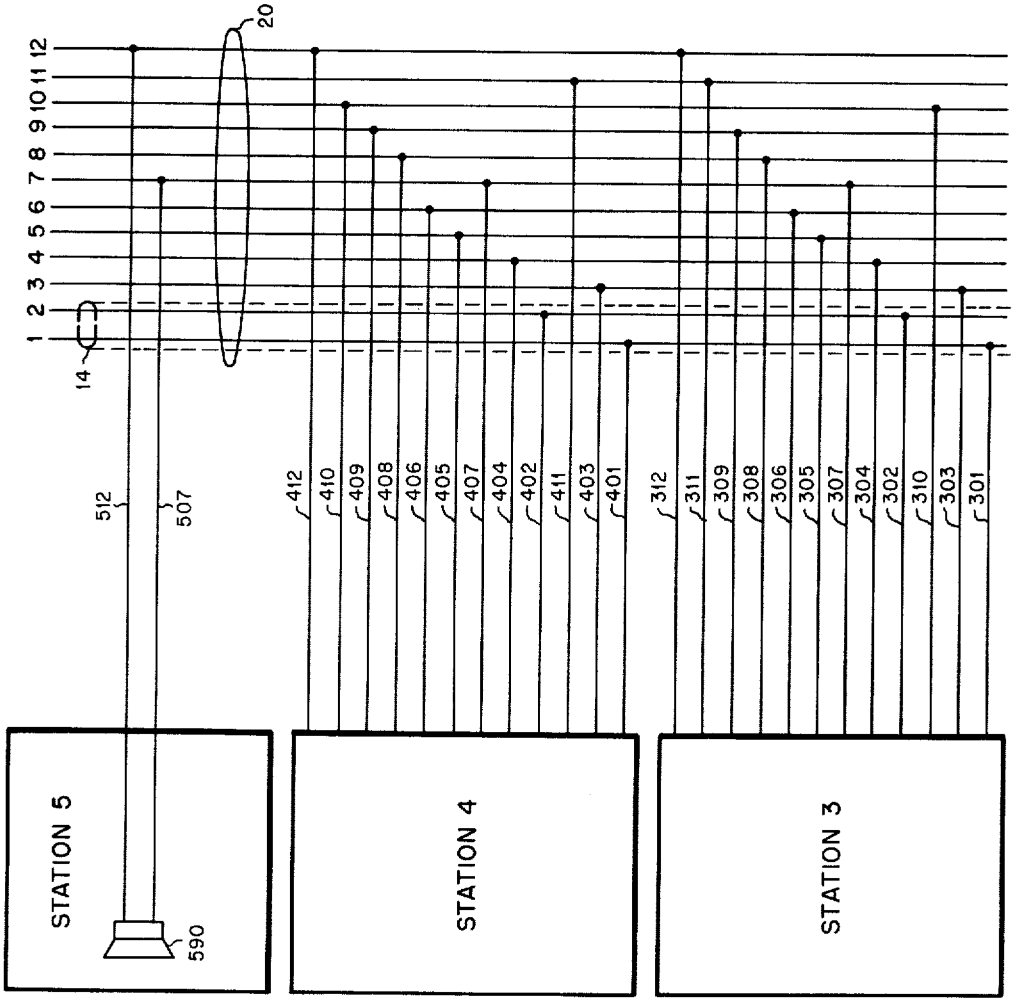
FIG. 2 is a block diagram showing the connections to the remaining parts of the system.

In the embodiment shown by FIGS. 1 and 2 when placed together as shown in FIG. 3 there are five stations, namely stations 1, 2, 3, 4, and 5. Stations 1, 2, 3, and 4 are all constructed similarly and each acts as a master station capable of selecting any other station. Station 5 is a slave station capable only of answering a call from any one of the other four stations. All five stations are interconnected by a twelve wire cable 20 passed serially from one station to the next. Cable 20 also serves to interconnect the stations and a single amplifier 22, a talk-listen relay 24 and a battery 26. With this arrangement it is only necessary for the lead wires from each station to connect to the cable 20 by short leads. The usual long leads to a centrally located common amplifier are therefore avoided.

The twelve wires of cable 20 include a calling station return wire 1, which provides a return circuit for the transducer of the calling station and is common for all stations; a calling station bus wire 2, which provides the common bus wire for carrying signals between the calling station and amplifier 22; an operating current return circuit 3 providing a return for the operating current for the busy lights in each station and under certain conditions the relay actuating coil and amplifier 22 as well; a talk-listen relay bus wire 4 to carry current to relay 24; a busy light bus wire 5 for carrying current to the busy lights of each station; a common selected station bus wire 6 providing the common connection carrying the signals to and from amplifier 22; a selected station return wire 7 providing a common return circuit from the selected station to the amplifier; and selected station bus wires 8, 9, 10, 11, and 12 which provide the circuits which are selectively utilized to connect the transducer of the selected station 1, 2, 3, 4 or 5, respectively, to the common selected station bus wire 6 for connection to amplifier 22. In addition the cable 20 may have wires 1 and 2 shielded by a shield 14 from the other conductors if cable 20 is long and feedback is a problem.

As shown in FIG. 1 the battery 26 provides the only source of power for the system. Battery 26 is connected at its positive terminal to wire 5 by wire 70, to the power terminal 28 of amplifier 22 by wire 30 and to the actuating coil 29 of relay 24 by wire 71. The other terminal of relay coil 29 is connected by wire 73 to wire 4 of cable 20. The negative side of battery 26 is connected to a first contact 31 of relay 24. Contact 31 is actuated simultaneously with second and third contacts 32 and 33 by the activating coil 29 when it is energized. When so actuated, the relay contacts 31, 32 and 33 are disconnected from contacts 34, 35 and 36 respectively, with which they connect in the normal de-energized state of relay 24 and connect with contacts 37, 38, and 39 respectively, in the other or actuated state of relay 24.

Contacts 36 and 38 both connect by way of wire 40 to output terminal 42 of amplifier 24. Contacts 35 and 39 both connect by way of wire 44 to input terminal 46 of amplifier 22. Contact 34 is connected by wire 48 to wire 3 of cable 20, and contact 37 is connected by wire 50 to the common terminal 52 of amplifier 22 which is the common terminal for the input, output, and power connections. The other contacts 32 and 33 are respectively connected by amplifier leads 54 and 56 to wires 6 and 2 of cable 20.

Separate return leads 60, 61 and 62 respectively connect wires 1 and 7 and shield 14 to common terminal 52. These separate leads prevent feedback between amplifier input and output circuits.

Station 1, as shown in FIG. 1, is connected to the wires of cable 20 by short leads 101—112 while station 2 is connected to cable 20 by corresponding leads similarly numbered in the 200 series, namely 201—212.

Station 3 and station 4 are similarly connected to cable 20 by wires numbered in the 300 and 400 series respectively with the positions of the connecting wires with respect to one another indicating connections to elements in the respective stations similar to those shown for stations 1 and 2.

Slave station 5 is connected by wires 507 and 512 to wires 7 and 12 respectively of cable 20.

As shown in FIG. 1, station 1 comprises four station selector switches 170–173, one for each of the stations which station 1 can select. These switches are shown as multiple pole, double throw switches which may preferably be lever type switches which have a depressed position for their selected state and another normal position or state. Switch 170, for example, has poles or contacts 170*a*, 170*d*, 170*g* and 170*j* each forming separate switch means which connect with contacts 170*b*, 170*e*, 170*h* and 170*k* respectively in the normal position or state and with contacts 170*c*, 170*f*, 170*i*, and 170*m* in the depressed or selected position or state. The switches 171, 172, and 173 are of similar construction and connect contacts 171*a*—171*m*, 172*a*—172*m* and 173*a*—173*m* in a similar manner to that explained above for contacts 170*a*—170*m*, respectively.

The contacts 170*a*—173*a* all connect with wire 101 as do contacts 170*i*—173*i*. Wire 101 also connects to one side of a busy light 180 which is connected to wire 105 on its other side.

Contacts 170*c*—173*c* connect to wire 103, contacts 170*f*—173*f* connect to wire 102, contacts 170*j*—173*j* connect to wire 106 and contacts 170*m*—173*m* are individually connected to wires 109—112 respectively. The contacts 170*d*—173*d* connect with contacts 170*e*—173*e* respectively in the normal position of switches 170—173 and thereby connect contact 173*e* with contact 170*e* by way of wires 181—183 which connect the "*e*" contacts of each switch to the "*d*" contact of the next lower numbered switch. A similar connection is made between contacts 170*h* and 173*g* by wires 184—186.

Contacts 173*d* and 173*g* are connected to opposite sides of loudspeaker 190 by wires 191 and 192, respectively.

Contacts 170*e* and 170*h* are connected to wires 108 and 107, respectively, so that when switches 170—173 are all in their normal positions there is a connection between one side of the loudspeaker 190 and wire 108 and the other side of the loudspeaker 190 and wire 107.

Station 1 also includes a talk-listen switch 195 having a movable contact 196 which in its normal state or listen position is in contact with idle contact 197 and which in its actuated state or talk position is in contact with contact 198 which in turn connects to wire 104. The contact 196 being connected to wire 107 when the switch 195 is in the talk position, wires 107 and 104 are connected. Switch 195 should desirably be of the type which does not lock in the talk position and has a spring return to the listen position.

The operation of the intercommunication system of FIGS. 1 and 2 is best illustrated by reference to FIG. 1 wherein the detailed circuits of stations 1 and 2 are shown. When the system is not in use the selector switches 170—173 of station 1 and 270—273 of station 2 are all in their normal positions as shown in FIG. 1, the talk-listen switches 195 and 295 are in the listen position as shown in FIG. 1 and relay 24 is in the deenergized state with its contacts 31, 32 and 33 in the position shown. Under these conditions amplifier 22 is not connected to battery 26 and the system is in its "off" condition.

Assuming that an operator at station 1 desires to contact station 2, the operator would depress selector switch 170 making contacts 170*a*, 170*d*, 170*g*, and 170*j* with contacts 170*c*, 170*f*, 170*i*, and 170*m* respectively. The making of contacts 170*a* and 170*c* completes a circuit from the negative side of battery 26 through wire 27, contact 31, contact 34, wire 48, wire 3, wire 103, contact 170*c*, contact 170*a*, wire 101, wire 1 and wire 60 to common terminal 52 of amplifier 22. The positive side of battery 26 connects through conductor 30 to power terminal 28 thus completing the circuit for energization of amplifier 22 by battery 26. The amplifier 22 may be of any of the well known circuits used for intercommunications systems but should preferably be of the type utilizing transistors in order that no warm up time will be required before beginning voice transmission.

The making of contacts 170*a* and 170*c* also completes a circuit from the positive side of battery 26 through wires 70, 5, 105, busy light 180, wire 101, contacts 170*a* and 170*c*, wires 103, 3, 48, contacts 34 and 31, wire 27 to the negative terminal of battery 26 whereby busy light 180 is lit indicating that the system is in use. The busy light 280 of station 2 is in parallel with light 180 by virtue of its connection between wire 5 and wire 1 by way of wire 205, light 280 and wire 201. The busy lights of stations 3 and 4 are likewise lit whenever a station is selected by the operator at any of the other stations for their busy lights are also connected in parallel by similar circuits.

The making of contacts 170*d* and 170*g* with contacts 170*f* and 170*i* respectively, serve to connect speaker 190 between the calling station bus wire 2 and the calling station return wire 1. The connection to one side of loudspeaker 190 is by way of wire 102, contacts 170*f* and 170*d*, wire 181, contacts 171*e* and 171*d*, wire 182, contacts 172*e* and 172*d*, wire 183, contacts 173*e* and 173*d* and wire 191. From the other side of loudspeaker 190 to wire 1 through wire 192, contacts 173*g* and 173*h*, wire 186, contacts 172*g* and 172*h*, wire 185, contacts 171*g* and 171*h*, wire 184, contacts 170*g* and 170*i* and wire 101.

As long as the talk-listen switch 195 is in the listen position relay 24 is de-energized and the calling station bus wire 2 connects to output terminal 42 of amplifier 22 through amplifier lead 56, contacts 33 and 36 of relay 24, and wire 40. The calling station return wire 1 connects through wire 60 to the common terminal 52 of amplifier 22 thus placing the loudspeaker 190 across the output of amplifier 22.

The making of contacts 170*j* and 170*m* serves to accomplish the selection of the station being called, station 2 in this illustration, by connecting the common selected station bus wire 6 to the selected station bus wire for station 2, namely wire 9. This connection is by way of wire 106, contacts 170*j* and 170*m* and wire 109.

The loudspeaker 290 of station 2 will thus be connected on one side to the amplifier input terminal 46 by way of wires 209, 9, 109, contacts 170*m* and 170*j* wires 106, 6, 54, contacts 32 and 35 and wire 44, and on the other side to the amplifier common terminal 52 by way of wires 207, 7, and 61. Selected station 2 is thus connected for transmitting to the input of amplifier 22 and calling station 1 is connected for reception from the output of amplifier 22 whenever the talk-listen switch in the calling station, switch 195 in this illustration, is in the listen position and station 2 has been selected.

It is evident from the above description of the operation of selector switch 170 that each of the selector switches performs several functions; namely, turning the amplifier on, lighting the busy light, connecting the transducer to the cable 20 and connecting in the selected station.

When the operator at station 1 desires to talk, the talk-listen switch 195 is operated to make contacts 196 and 198. As a result, the actuating coil 29 of relay 24 is energized. This is accomplished by battery 26 through a circuit from its positive side through wire 71 to one terminal of actuating coil 29 and from the negative side of battery 26 through wire 27, contacts 31 and 34, wires 48, 3, 103, contacts 170*c* and 170*a*, wires 101, 1, 60, 61, 7, 107, contacts 196 and 198 of talk-listen switch 195, wires 104, 4 and 73 to the other terminal of the actuating coil 29.

Actuation of relay 24 by energizing the actuating coil 29 causes contacts 31, 32, and 33 to be pulled into contact with contacts 37, 38, and 39 respectively. The making of contacts 31 and 37 changes the path through which current flows from the negative side of battery 26 to the busy light 180, amplifier 22 and actuating coil 29. The circuit now connects the negative side of battery 26 through wire 27, contacts 31 and 37, wires 50, 60, 1, and wire 101 to one side of busy light 180.

The new path to the common terminal 52 of amplifier 22 for supply of power to amplifier 22 from the negative side of battery 26 is by a similar path through wire 27, contacts 31 and 37 and wire 50. The power for the amplifier therfore does not flow through the calling station return wire 1 as was the case before energization of relay 24 but instead flows through wire 50 which is isolated from the amplifier input circuit.

The connection from the negative side of the battery 26 to the relay actuating coil 29 is now through wire 27, contacts 31 and 37, wires 50, 61, 7, 107, contacts 196 and 198 of talk-listen switch 195, wires 104, 4 and 73. Thus the current for maintaining actuating coil 29 energized also does not flow through calling station return wire 1 as it did when talk-listen switch 195 was in the listen position.

It should be noted that actuation of relay 24 does not in any way affect the connections of the positive side of battery 26 to amplifier 22, the busy lights such as 180 or actuating coil 29, but is only effective to change the connections to the negative side of battery 26.

Actuation of relay 24 in addition to switching the circuits from the negative side of battery 26 to amplifier 22, coil 29 and busy light 180 by moving contacts 31 also switches the connections of the amplifier input and output by moving contacts 32 and 33. For example, when contacts 32 is made with contact 38 upon energization of coil 29 the output terminal 42 of amplifier 22 is connected to the common selected station bus wire 6 and therefore to loudspeaker 290 of the selected station 2 by the route previously explained. This connection to wire 6 is by way of wire 40, contacts 38 and 32, and wire 54. Thus station 2 can only receive when the talk-listen switch in station 1 is in the talk position.

The actuation of relay 24 thus accomplishes the dual function of switching the operating circuits and the amplifier input and output circuits.

The making of contacts 33 and 39 connects the input terminal 46 of amplifier 22 to the calling station bus wire 2 by way of wire 44, contacts 39 and 33, and wire 56. Loudspeaker 190 is thus connected to the input of amplifier 22 and station 1 can transmit. It should be noted that the actuation of relay 24 does not in any way change the route of the connection between the loudspeaker 190 and 290 to the common terminal 52 of amplifier 22.

If the operator at station 1 desires to select a station other than station 2, one of the other selecting switches 171, 172 or 173 may be actuated to select stations 3, 4, or 5 respectively.

Stations 2, 3, and 4 may also be used by operators at their respective locations to call any other station by a similar selection of their respective selector switches and by appropriate operation of their respective talk-listen switches.

The only difference between the connections of stations 1, 2, 3, and 4 to cable 20 is in the connection of the *"e"* contacts of their respective selector switches, such as 170 and 270 for stations 1 and 2 and the connections to the *"m"* contacts of the stations. This *"e"* contact in each station is connected to the selected station bus wire for that particular station and the connections to the several *"m"* contacts are individually from the selected station bus wires for the other stations.

Slave station 5 is only provided with a loudspeaker 590 which is connected to the selected station return wire 7 by wire 507 and to the selected station bus wire 12 for station 5 by wire 512. Slave station 5 is therefore only capable of replying to other stations.

With the circuits shown in FIGS. 1 and 2 it is possible to add other stations to the system by connecting them to the various conductors of cable 20 in the same way that another station is connected. The added station would then be working in parallel with the other station and could select only the stations selectable by that other station and could receive calls only from stations other than the station it parallels.

The circuits of FIGS. 1 and 2 also allow any one station to select any number of other stations with the selector switch arrangement shown. The calling station can then disconnect any of those called without disconnecting the others since the selection is made directly by means of the selector switches and without the use of intermediate relays.

What is claimed is:

1. An intercommunications system comprising a plurality of stations, each of said stations including a single transducer for effecting both voice transmission and reception, a multiple conductor cable having a plurality of bus wires, said cable being passed serially to each of said stations, said cable including a calling station bus wire common to all stations, a separate selected station bus wire for each of said stations and a common selected station bus wire, an amplifier having an input and an output, first and second amplifier leads coupled to said calling station bus wire and said common selected station bus wire respectively, relay means connecting said first and second amplifier leads to the output and input of said amplifier respectively when said relay is in its normal state and for reversing the connection of said leads when said relay is in another state, a first switch means at each of said stations for connecting the transducer of that station to its selected station bus wire when in its normal state and for connecting the transducer to said calling station bus wire when in another state, a second switch means at each of said stations for selectively connecting the selected station bus wire of the station being called to said common selected station bus, and a third switch means at each of said stations connected to change said relay from its normal state to said other state when the operator at the calling station desires to talk.

2. An intercommunications system according to claim 1 in which said cable includes a calling station return wire, and in which said relay means is operative to connect a source of power to said amplifier by way of said calling station return wire when said relay means is in its normal state and to change said power connection to a circuit not including said calling station bus wire or said calling station return wire when said relay is in said other state.

3. An intercommunications system according to claim 1 including a source of power for said amplifier, a fourth switch means operable to connect said source of power to said amplifier simultaneously with the selective connection of one of said selected station bus wires to said common selected station bus.

4. An intercommunications system comprising a plurality of stations, each of said stations including a single transducer for effecting both voice transmission and reception, a multiple conductor cable having a plurality of bus wires, said cable being passed serially to each of said stations, said cable including a calling station bus wire and separate calling and selected station return wires common to all stations, a separate selected station bus wire for each of said stations and a common selected station bus wire, an amplifier having an input terminal, an output terminal and a common terminal, first and second amplifier leads coupled at one end to said calling station bus wire and said common selected station bus wire respectively, relay means connecting the other ends of said first and second amplifier connecting leads respectively to the output terminal and input terminal of said amplifier when said relay is in its normal state and for reversing the connection of said leads when said relay is in another state, first and second return leads connecting said calling and selected station return wires respectively to said common terminal, a first switch means at each of said stations for connecting the transducer of that station to its selected station bus wire and said selected station return wire when in its normal state and for connecting the transducer to said calling station bus wire and said calling station return wire when in another state, a second switch means at each of said stations for selectively connecting the selected station bus wire for the station being called to said common selected station bus, and a third switch means at each of said stations connected to operate said relay from its normal state to said other state when the operator desires to talk.

5. An intercommunications system comprising a plurality of stations, each of said stations including a single transducer for effecting both voice transmission and reception, a multiple conductor cable having a plurality of bus wires, said cable being passed serially to each of said stations, said cable including a calling station bus wire common to all stations, a separate selected station bus wire for each of said stations and a common selected station bus wire, an amplifier having an input and output, first and second amplifier connecting leads coupled to said calling station bus wire and said common selected station bus wire respectively, relay means connecting said first and second amplifier connecting leads to the output and input of said amplifier respectively when said relay is in its normal state and for reversing the connection of said leads when said relay is in another state, a first switch means at each of said stations for connecting the transducer of that station to its selected station bus wire when in its normal state and for connecting the transducer to said calling station bus wire when in its actuated state, a second switch means at each of said stations for selectively connecting the selected station bus wire of the station being called to said common selected station bus when in its actuated state, a source of power, a third switch means at each of said stations connected to energize said relay from its normal state to said other state by connection to said source when the operator desires to talk, a fourth switch means at each station operable when in its actuated state to connect said source of power to said amplifier, and means for actuating said first, second and fourth switch means simultaneously.

6. An intercommunication system comprising a plurality of stations and a single amplifier, each of said stations having a loudspeaker for transmission and reception, a plurality of interconnecting bus wires passing serially to each of said stations and to said amplifier, said interconnecting bus wires including a common calling station bus wire, a separate selected station bus wire for each station, a common selected station bus wire, a calling station return wire, a selected station return wire, a busy light bus wire, a relay bus wire and a busy light return wire, said amplifier having an input terminal, an output terminal, a power terminal and a common terminal, a relay having first, second and third contacts operable to be connected to fourth, fifth and sixth contacts or to seventh, eighth, and ninth contacts in accordance with the state of energization of an actuating coil, first and second amplifier connecting leads connected at one end to said calling station bus wire and said common selected station bus wire respectively and connected at their other ends to said third and second contacts of said relay, a source of power, means connecting one terminal of said source to said first contact of said relay, means connecting the other terminal of said amplifier and one terminal of said actuating coil of said relay, means connecting the other terminal of said relay actuating coil to said relay bus wire, separate return leads connecting said calling station return wire and said selected station return wire to said common terminal of said amplifier, means connecting said sixth and eighth contacts of said relay to said amplifier output terminal, means connecting said fifth and ninth relay contacts to said amplifier input, means connecting said fourth relay contact to said busy light return circuit, means connecting said seventh relay contact to said amplifier common terminal, a plurality of two-position station selection switches in each of said stations, each switch in a station being associated with a separate one of the other of said stations, said switches each having first, second, third and fourth contacts, said second and third contacts connecting said loudspeaker between a corresponding selected station bus wire and said selected station return wire when in the unselected position and connecting said loudspeaker across said calling station bus wire and said calling station return wire when in the selected position, said first contact of said selector switch being operative in the selected position to connect said calling station return wire to said busy light return wire, said fourth contact of said selector switch being operative in the selected position to connect the selected station bus wire of the station being called to said common selected station bus wire, a busy light connected between said busy light bus wire and said calling station return wire, and a talk-listen switch at each station operative when in the talk position to connect said relay bus wire and said listening station return wire.

References Cited in the file of this patent

UNITED STATES PATENTS 2,536,820 Prahm ------------------ Jan. 2, 1951

UNITED STATES PATENT OFFICE

CERTIFICATE OF CORRECTION

Patent No. 3,103,557 September 10, 1963

George Serotta

It is hereby certified that error appears in the above numbered patent requiring correction and that the said Letters Patent should read as corrected below.

Column 8, line 12, after "said" insert -- source to said busy light bus wire, said power terminal of said --.

Signed and sealed this 20th day of October 1964.

(SEAL)
Attest:

ERNEST W. SWIDER
Attesting Officer

EDWARD J. BRENNER
Commissioner of Patents